Patented May 4, 1937

2,079,120

UNITED STATES PATENT OFFICE 2,079,120

PROCESS FOR PRODUCTION OF CAUSTIC ALKALI SOLUTIONS ADAPTED TO FORMATION OF ALKALI CELLULOSE AND HAVING A UNIFORM CATALYTIC ACTIVITY

Albert H. Hooker, Burr H. Ritter, and Stanley F. M. MacLaren, Niagara Falls, N. Y., assignors to Hooker Electrochemical Company, New York, N. Y., a corporation of New York Application August 7, 1935, Serial No. 35,152

4 Claims. (Cl. 23—230)

This invention relates to processes for production of caustic alkali solutions adapted to formation of alkali cellulose and having a uniform catalytic activity with respect to their behavior in reactions such as those involved in the production of cellulosic derivatives by the "viscose" or alkali cellulose xanthate process.

More particularly, our invention has to do with standardization of caustic soda solutions in respect of their content of various metallic substances normally found in such solutions and generally regarded as objectionable impurities. Among such substances are iron, manganese, copper, nickel, chromium, vanadium, etc. and their derivatives. These substances may be picked up either in the process of manufacture of the caustic alkali, whether by the electrolytic or ammonia soda process, or in its subsequent concentration in evaporators.

Formerly a large part of the caustic soda of commerce was shipped in solid, substantially anhydrous, form. It was produced by first concentrating in vacuum evaporators to a solution containing about 50% caustic soda, and then further evaporating in iron fusion kettles to the solid anhydrous product. The viscose, rayon and cellophane industries, etc. were developed mainly by the use of this solid caustic soda.

The 50 percent solutions, when they have been concentrated in iron vacuum evaporators, normally contain iron in the proportion of about 200 parts by weight per million parts of caustic soda. Owing to the low solubility of iron in fused caustic soda, much of this iron is subsequently precipitated in the fusion step. At the same time, however, maganese is picked up.

In order to save the cost of the fusion step and of subsequent redissolving at the customer's plant, it has become more and more common to ship caustic soda in tank cars as 50 percent solution. When the viscose industries attempted to use this solution they found that it discolored their product. In order to reduce the iron content of these solutions, manufacturers of caustic soda had recourse to vacuum evaporators made with "Monel metal" tubes. This reduced the iron content, but led to the appearance of small but appreciable quantities of copper and nickel.

In co-pending applications, Serial Nos. 689,955 and 700,361, there are disclosed processes by which the contaminants in caustic soda solutions may be diminished almost to the vanishing point.

One of the steps in the viscose process, following the treatment of the cellulose with caustic soda, is to age the alkali cellulose thus produced for a period of from 48 to 96 hours. During this time, oxygen is absorbed and depolymerization takes place, lowering the viscosity of the material.

When the super high grade solution made by the purification processes of the above mentioned applications was used in the production of viscose it was found that the aging of the alkali cellulose required an abnormal length of time. While the quality of the product was not thereby impaired, the extra aging period threw the whole plant routine out of balance.

Although it was previously known that iron in the caustic soda exercised a catalytic effect in the process, the precise relationship between the aging period and quantity of iron or other metallic impurities present was not known and it could not have been foreseen that the purification of the caustic soda would have such a marked effect upon the aging period.

After months of research and a very large number of experiments we have succeeded in evaluating the effect, not only of the iron, but of many other metals, in the viscose process.

In this way we have been able to express the reactivity of the caustic soda, particularly with respect to oxidation of alkali cellulose, which for convenience we call its "catalytic index", in terms of the quantity of metals present, in parts by weight per million parts of caustic soda.

It is not possible to control the above mentioned processes for removal of metallic contaminants so as to leave small but definite quantities of the contaminants, but by removing the contaminants until those remaining are less than the minimum desirable quantity and then introducing the quantity of the contaminants necessary to make up the deficiency, the solution can be standardized in respect to the quantity of metals present.

Our invention consists therefore in first indiscriminately removing the contaminants and then reintroducing the necessary small quantities of the same or other contaminants to give to the solution the desired catalytic index. By this means we have been able to establish a standard catalytic index and to supply caustic soda solutions having any desired catalytic index to the viscose industries. This is of great advantage to such industries as it enables them to balance the steps of their process with assurance that they will not be thrown out of balance by causes beyond the control of their operatives. It is of further advantage in that such industries are able to specify and obtain caustic soda of higher catalytic index than heretofore and increase their output without danger of loss of quality.

In the course of this work we have determined the catalytic effect of the various metals relative to each other. In doing so we find that iron, copper and nickel are of substantially equal effect. We have furthermore made the original discovery that, contrary to the general belief, as reflected in the literature upon the subject, (as, for example, in the Journal of the Textile Inst. June 1932, pages T 95 et seq.) manganese does not have a retarding effect on the aging of alkali cellulose, but quite the reverse. In fact, we have proven that the effect of manganese is greater than that of any other metal commonly found in caustic soda solutions, being approximately ten times that of iron. For convenience we have therefore devised a method of expressing the relative catalytic effect or activity of a group of metals in terms of the activity of iron. Thus, if a particular solution contains 10 parts of iron, 1½ parts copper and 5¼ parts manganese per million parts of caustic soda, we express its relative catalytic activity as $10+1.5+(10\times 5.25)=64$, i. e., parts of iron or the equivalent.

It so happens that these figures correspond to the average analyses of a large number of samples of caustic soda solutions made up from the solid anhydrous product as used by the viscose industry before the 50 percent caustic soda solution became commercially available. As this solution made from solid caustic soda has become more or less standard, we arbitrarily call its catalytic index 100. Proceeding upon this basis therefore, we are able to produce caustic soda solutions having a catalytic index of 15, 25, 50, 100, 200 etc. as may be desired.

Referring to the drawings.

The viscosity in each case is measured by the time in seconds required for a ⅛ inch steel ball to fall ten inches in the material at 21° C.

Figure 1:
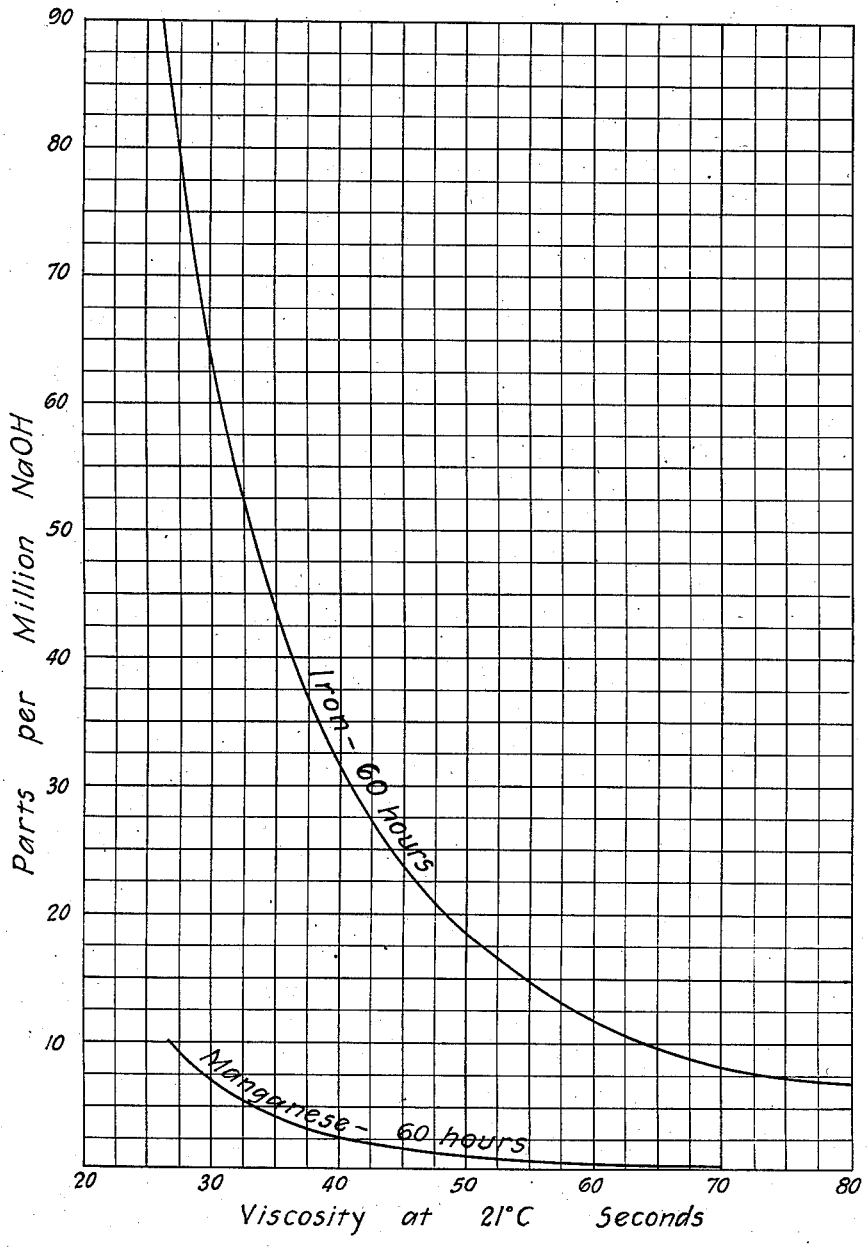
Fig. 1 is a graph giving a comparison between iron and manganese as regards their catalytic effect upon the change in viscosity of alkali cellulose in a period of 60 hours.

Referring to Fig. 1, it will be seen that the quantity of manganese required to produce in 60 hours a viscosity of 30 seconds is slightly more than one tenth of the quantity of iron to produce the same viscosity in the same time and the quantity of manganese to give a viscosity of 50 seconds in the same time is slightly less than one tenth the quantity of iron necessary to produce the same result. This is equivalent to saying that the catalytic activity of manganese is approximately ten times that of iron.

Figure 2:
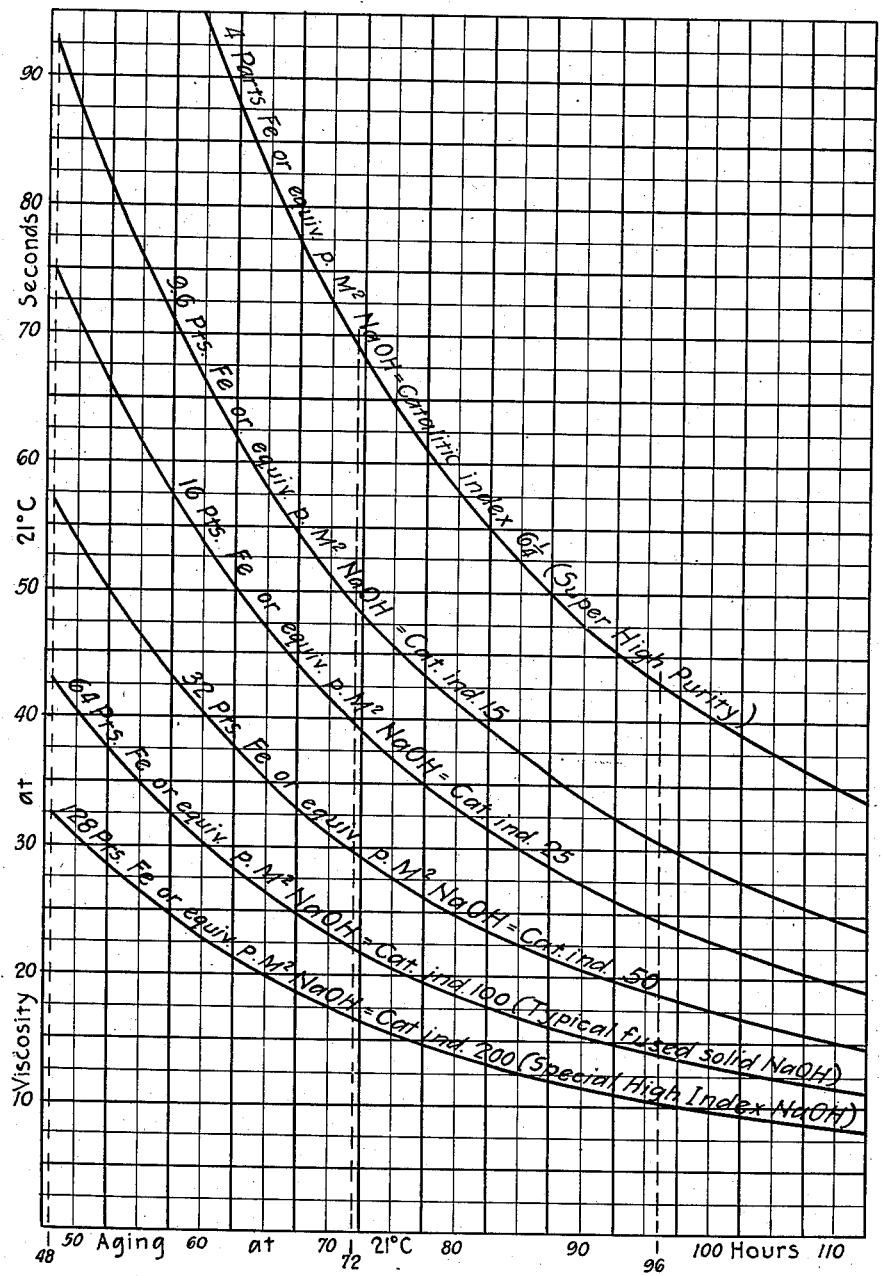
Fig. 2 is a graph showing the rate of change in viscosity of alkali cellulose made from caustic soda of various indices from 6¼ to 200.

Referring to Fig. 2, it will be seen that alkali cellulose made from caustic soda having 64 parts iron or the equivalent per million parts NaOH, or a catalytic index of 100, shows a viscosity after 96 hours of 14 seconds. In the same time alkali cellulose made from super high purity caustic soda having only 1 part iron per million of NaOH, shows a much higher viscosity, or 76 seconds. On the other hand, by increasing the catalytic index to 200, a viscosity of 14 seconds may be attained after only 79 hours.

It will be further noted that the latter result can be obtained by using either 128 parts of iron or approximately 12.8 parts manganese per million of NaOH. It should be observed that 128 parts of iron per million parts of NaOH is less than the quantity of iron often found in unrefined 50 percent caustic soda solutions, while 12.8 parts of manganese per million parts of NaOH is more than the quantity of manganese normally found in such solutions. It should also be noted that the smaller quantity of manganese is less objectionable, for considerations other than those of catalytic activity, than the larger quantity of iron. Hence the preparation of solutions having a standard catalytic index in accordance with our process usually involves removal of iron and addition of manganese.

In Fig. 2 the time scale begins at 48 hours, the period of aging from 0 to 48 hours having been omitted as it is not important. However, it is worth while to point out that all the curves of Fig. 2 start at the same point, i. e., that representing viscosity of the alkali cellulose before it has been depolymerized at all. From this point the curves diverge rapidly, owing to the fact that the alkali cellulose containing more catalyst depolymerizes much more rapidly at first than that containing less catalyst. At 48 hours, however, these curves begin to converge. Eventually they coincide again in a horizontal line representing the viscosity after an indefinite aging. Therefore, the effect of the catalyst, in so far as viscosity is concerned, is transitory. Moreover, if the spacing of the curves be observed it will be found that the effect of the catalyst is not proportional to its quantity. Thus, the doubling of the catalyst from 64 to 128 parts has less effect than doubling from 32 to 64 parts. This clearly shows that a point may be reached at which the further addition of catalyst produces a result hardly commensurate with the disadvantages, such as danger of discoloration. Practical experience shows that the upper limit beyond which it is undesirable to go is about 128 parts of iron or its equivalent.

The metals to be added may be in the form of their salts or oxides, or even in metallic form, since the quantities are extremely small and these metals are sufficiently soluble in hot caustic soda for the purpose.

It is obvious that we cannot here discuss all the materials that may have catalytic activity under the conditions obtaining in the aging of alkali cellulose. We do not wish to be limited, therefore, to the metals mentioned, which are given only by way of example. Neither do we wish to be limited to caustic soda, as caustic potash is also used in the viscose process.

What we claim is:

1. The process for production of caustic alkali solutions adapted to formation of alkali cellulose as a step in the production of cellulose xanthate and having a uniform catalytic activity with respect to the rate of depolymerization of alkali cellulose made by reaction of cellulose therewith, from caustic soda solution containing deficient and non-uniform traces of one or more metals of the group consisting of iron, manganese, copper and nickel, which comprises determining the respective quantities of said metals in each batch, evaluating on the basis that one part of manganese is equivalent to ten parts of iron, copper or nickel, the aggregate catalytic activity of said metals in said depolymerization and adding manganese to bring the aggregate catalytic activity in said depolymerization of the metals in said batch up to a specified standard.

2. The process for production of caustic soda solutions adapted to formation of alkali cellulose as a step in the production of cellulose xanthate and having a uniform catalytic activity with respect to the rate of depolymerization of alkali cellulose made by reaction of cellulose therewith, from caustic soda solution containing deficient and non-uniform traces of one or more metals of the group consisting of iron, manganese, copper and nickel, which comprises determining the respective quantities of said metals in each batch, evaluating, on the basis that one part of manganese is equivalent to ten parts or iron, copper or nickel, the aggregate catalytic activity of said metals in said depolymerization in terms of that of an equivalent quantity of iron and adding manganese to bring the aggregate catalytic activity in said depolymerization of the metals in said batch up to that of substantially 64 parts of iron per million parts of said caustic soda.

3. The process for production of caustic soda solutions adapted to formation of alkali cellulose as a step in the production of cellulose xanthate and having a uniform catalytic activity with respect to the rate of depolymerization of alkali cellulose made by reaction of cellulose therewith, from caustic soda solution containing traces of one or more metals of the group consisting of iron, manganese, copper and nickel, in such quantities that their combined catalytic activity, with respect to said depolymerization, when evaluated on the basis that one part of manganese is equivalent to ten parts of iron, copper or nickel, is less than a specified standard equivalent to that of not over 128 parts of iron per million parts of caustic soda, which process comprises determining the respective quantities of said metals in said solution and adding manganese until the combined catalytic activity of said metals in the solution with respect to said depolymerization, when evaluated upon said basis is equal to said standard.

4. The process for production of caustic soda solutions adapted to formation of alkali cellulose as a step in the production of cellulose xanthate and having a uniform catalytic activity, with respect to the rate of depolymerization of alkali cellulose made by reaction of cellulose therewith, from caustic soda solution containing in varying quantities traces of metals of the group consisting of iron, manganese, copper and nickel which comprises purifying the solution of such metals generally, to a point at which the combined catalytic activity, with respect to said depolymerization, of the metals remaining in the solution when evaluated on the basis that one part of manganese is equal to ten parts of iron, copper or nickel, is less than a specified standard equivalent to that of not over 128 parts of iron per million parts of caustic soda and then adding to the solution manganese until the combined catalytic activity of the metals in the solution, with respect to said depolymerization, when evaluated on said basis, is equal to said standard.

ALBERT H. HOOKER.
BURR H. RITTER.
STANLEY F. M. MacLAREN.